Figure 1:
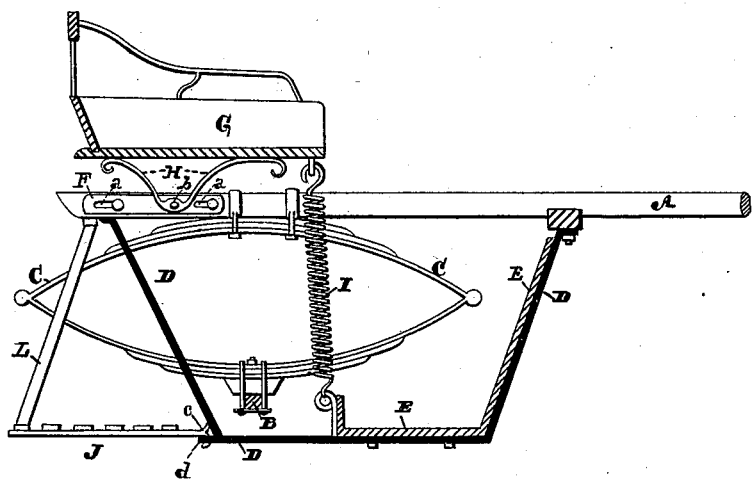

(No Model.)

S. W. METCALF.
TWO WHEELED VEHICLE.

No. 250,275. Patented Nov. 29, 1881.

Witnesses
Geo. H. Strong.
Frank A. Brooks

Inventor
Samuel W. Metcalf
By Dewey & Co.
Attys

United States Patent Office.

SAMUEL W. METCALF, OF SANTA ROSA, CAL., ASSIGNOR TO PHŒBE METCALF, AMELIA THOMPSON, AND HELEN SOUTHWICK, ALL OF SAME PLACE.

TWO-WHEELED VEHICLE.

SPECIFICATION forming part of Letters Patent No. 250,275, dated November 29, 1881.

Application filed September 27, 1881. (No model.)

*To all whom it may concern:*

Be it known that I, SAMUEL W. METCALF, of Santa Rosa, county of Sonoma, State of California, have invented an Improvement in Two-Wheeled Vehicles; and I hereby declare the following to be a full, clear, and exact description thereof.

My invention relates to the class of vehicles, and more especially to certain improvements in two-wheeled vehicles; and it consists in a novel manner of mounting or attaching the seat to the body or frame, the object of which is to overcome the forward and backward or jerky motion communicated to the seat by the movement of the horse; and it consists, further, in a removable rack attached to the frame, the design of which is to conveniently carry necessary articles, all of which will hereinafter more fully appear, reference being made to the accompanying drawing, in which the figure is a vertical section.

In the drawing I have shown a two-wheeled vehicle of the class commonly called "breaking-carts," and being in longitudinal vertical section, but one side is shown and described, the other side being similar.

A represents the shaft, B the axle, and C the spring attached to axle and shaft, as shown.

D represents a metal strap or band secured to the shaft, thence inclining downward, passing horizontally under the axle and inclining upwardly, being again secured to the shaft at its rear end. The forward portions of the straps on each side support a foot-board, E, in their angle, as shown.

To the inside of the rear end of the shaft is secured a metal plate, F, having slots $a$ $a$ in its ends, through which bolts pass, whereby the plate may be adjusted forward or back.

G represents the seat, having under its end a curved support, H, the center of which is pivoted by a pin, $b$, to the plate F. The seat is therefore not rigidly attached to the body, and may rock forward and back. It is prevented from having too much play in either direction by the spiral spring I, the top of which is hooked to the forward end of the seat and the bottom to the rear of the foot-board.

As before mentioned, the parts thus described are on one side. There are similar parts on the other side, and there are therefore two adjustable plates, F, two bearing-supports, H, one on each end of the seat, and two spiral regulating-springs, I. In a two-wheeled vehicle the rise and fall of a horse, when trotting, affects directly the shafts, and the entire body turns on its wheels as the shafts are raised. This, when combined with the forward movement of the vehicle, gives to it a peculiarly-starting or jerky motion, which is unpleasant to the rider.

By pivoting the seat and adapting it to have a play of its own, and regulating it by the springs, the seat is rendered independent of the vehicle, as far as the rocking motion of the latter is concerned. The seat itself has no rocking motion, but by being loosely connected with the body the latter is allowed to have its motion without affecting the seat.

By the adjustable plates F the seat may be moved and adjusted when desirable.

In breaking-carts there is usually no room allowed to carry anything but the rider; but it becomes sometimes necessary to do this, and for this purpose I have the horizontal rack J, consisting of two side or end bars with transverse strips.

The forward ends of the end bars have a hook, $c$, which fits through a hole or slot in a projection, $d$, upon the rear ends of the straps D. These hooks have small shoulders on top, which impinge against the upturned portion of straps D, and prevent the rack from being raised above the horizontal. The hooks are readily removable, but are not liable to release themselves.

The rear end of the rack J is supported by a strap, L, on each side. This strap is secured above to the rear ends of the shafts. Any necessary article can be carried upon the rack with convenience, and when nothing has to be carried the rack may be readily removed.

Having thus described my invention, what I claim as new, and desire to secure by Letters Patent, is—

1. In a two-wheeled vehicle, a seat, G, the supports H of which are pivoted to the frame or body and regulated by springs I, attached to said seat and body, substantially as herein described.

2. In a two-wheeled vehicle, the combination and arrangement of the seat G, pivoted supports H, shafts A, and springs I, attached to a foot-board, E, or to the body of the vehicle and to the seat, substantially as and for the purpose herein described.

3. In a two-wheeled vehicle, the combination of the pivoted seat G, shafts A, and adjustable plates F, substantially as herein described.

In witness whereof I hereunto set my hand.

SAMUEL W. METCALF.

Witnesses:
WM. F. BOOTH,
S. H. NOURSE.